United States Patent Office 2,730,535
Patented Jan. 10, 1956

2,730,535
PRODUCTION OF SUBSTITUTED QUINONES

Alexander Gaydasch, Broadview, and William K. T. Gleim, Orland Park, Ill., assignors to Universal Oil Products Company, Chicago, Ill., a corporation of Delaware No Drawing. Application September 25, 1952, Serial No. 311,553

14 Claims. (Cl. 260—396)

This application is a continuation-in-part of our copending application Serial No. 117,714, filed September 24, 1949, now abandoned.

This invention relates to a process for preparing substituted quinones and particularly for preparing polysubstituted p-benzoquinones.

An object of this invention is to prepare a quinone having hydrocarbon substituents attached to the quinone ring.

Another object of this invention is to prepare a quinone having two hydrocarbon substituents attached to the quinone ring.

Another object of this invention is to produce a dialkyl-p-benzoquinone.

A still further object of this invention is to produce 2-tert-butyl-5-methyl-benzoquinone.

One embodiment of this invention relates to a process for producing a polyhydrocarbon-substituted p-benzoquinone which comprises reacting a polyhydrocarbon-substituted phenol having an unsubstituted carbon atom in the para position to the hydroxyl group with an oxidizing agent comprising an alkali chlorate and sulfuric acid in the presence of a vanadium pentoxide catalyst.

Another embodiment of this invention relates to a process for producing a polyalkyl-p-benzoquinone which comprises reacting polyalkyl phenol having an unsubstituted carbon atom in the para position to the hydroxyl group with an oxidizing agent comprising an alkali chlorate and sulfuric acid in the presence of a vanadium pentoxide catalyst.

A further embodiment of this invention relates to a process for producing a dialkyl-p-benzoquinone which comprises reacting a dialkyl phenol having an unsubstituted carbon atom in the para position to the hydroxyl group with an oxidizing agent comprising an alkali chlorate and sulfuric acid in the presence of a vanadium pentoxide catalyst.

We have found that polysubstituted phenols and particularly dialkyl phenols having an unsubstituted carbon atom in the para position to the hydroxyl group may be oxidized to the corresponding polyhydrocarbon-substituted or polyalkylated quinones when employing as oxidizing agents a mixture of an alkali chlorate and sulfuric acid in the presence of a vanadium pentoxide catalyst.

The following phenols are given as an illustration of those which are operable within the scope of the invention: 2,3-dimethylphenol, 2,5-dimethylphenol, 2,6-dimethylphenol, 2-methyl-3-ethylphenol, 2-methyl-5-ethylphenol, 2-methyl-6-ethylphenol, 2-methyl-3-n-propylphenol, 2-methyl-5-n-propylphenol, 2-methyl-6-n-propylphenol, 2-methyl-3-isopropylphenol, 2-methyl-5-isopropylphenol, 2-methyl-6-isopropylphenol, 2-methyl-3-n-butylphenol, 2-methyl-5-n-butylphenol, 2-methyl-6-n-butylphenol, 2-methyl-3-isobutylphenol, 2-methyl-5-isobutylphenol, 2-methyl-6-isobutylphenol, 2-methyl-3-sec-butylphenol, 2-methyl-5-sec-butylphenol, 2-methyl-6-sec-butylphenol, 2-methyl-3-tert-butylphenol, 2-methyl-5-tert-butylphenol, 2-methyl-6-sec-butylphenol, 2-methyl-3-amylphenol, 2-methyl-5-amylphenol, 2-methyl-6-amylphenol, etc., 2-ethyl-3-methylphenol, 2-ethyl-5-methylphenol, 2,3-diethylphenol, 2,5-diethylphenol, 2,6-diethylphenol, 2-ethyl-3-n-propylphenol, 2-ethyl-5-n-propylphenol, 2-ethyl-6-n-propylphenol, etc., 2-n-propyl-3-methylphenol, 2-n-propyl-5-methylphenol, etc., 2,3,5-trimethylphenol, 2,3,6-trimethylphenol, 2,3,5,6-tetramethylphenol, etc. The preferred compounds are the 2,5-dialkylphenols. No intention to unduly limit the generally broad scope of this invention is meant by the enumeration of the above examples. From these examples it can be seen that the polysubstituted phenol utilized in the process of the present invention may be represented by the following generic formula:

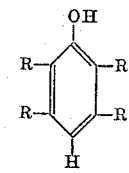

in which R represents hydrogen or the hydrocarbon substituent and in which formula at least two of the substituents are other than hydrogen. When two of the R's are hydrogen, a disubstituted phenol results, in which the position para to the hydroxyl group is unsubstituted. In the above examples, the substituent R was an alkyl group. R may also be an aryl group, such as phenyl, etc., an aralkyl group such as benzyl, etc., and an alkaryl group such as tolyl, etc.

In carrying out this process, a polyhydrocarbon-substituted phenol having an unsubstituted carbon atom in the para position to the hydroxyl group, is placed in a suitable reactor such as an open vessel, lined with ceramics or glass, or special alloy, and thereto is added dilute sulfuric acid, and an oxidizing agent such as potassium chlorate or sodium chlorate in the presence of a vanadium peroxide catalyst while the reaction temperature is kept at from about −10° to about 110° C. for a time sufficient to effect the quinone formation.

During the oxidation treatment, the reaction mixture is stirred vigorously, for example, by a motor driven stirrer, or by other suitable means. When oxidation is complete or has progressed to a suitable extent, the reaction mixture is cooled and the crude quinone layer is separated and purified either by recrystallization from a suitable solvent or by steam distillation or other means. The crude quinone which is obtained in a yield of from about 50 to about 90% is then recrystallized from alcohol or other suitable solvents to effect further purification.

The quinones produced in accordance with the process of the present invention are useful as intermediates in the synthesis of various organic compounds, and themselves may be used as oxidizing agents, germicides, and in various pharmaceutical preparations.

The nature of the present invention and the type of results obtained are indicated by the following example, although the data presented therein should not be misconstrued to limit unduly the broad scope of the invention.

2-tert-butyl-5-methylphenol was oxidized to 2-tert-butyl-5-methyl-benzoquinone by the following method: 9 grams of dry NaClO₃ was gradually added to an emulsion of 33 grams of 2-tert-butyl-5-methylphenol in 100 ml. of sulfuric acid (containing 10% by weight H₂SO₄) with 0.25 grams of vanadium pentoxide catalyst.

The reaction mixture was stirred for five hours at 70–80° C. and was then steam distilled. The steam distillate was an oil which crystallized slowly. It was recrystallized from a methanol-water mixture, giving a crystalline material with a melting point of 2-methyl-5-tert-butylbenzoquinone.

We claim as our invention:

1. A process for producing a polyalkyl p-benzoquinone which comprises reacting a polyalkyl phenol having an unsubstituted carbon atom in the para position to the hydroxyl group with an oxidizing agent comprising an alkali chlorate and sulfuric acid in the presence of a vanadium pentoxide catalyst.

2. A process for producing a dialkyl p-benzoquinone which comprises reacting a dialkyl phenol having an unsubstituted carbon atom in the para position to the hydroxyl group with an oxidizing agent comprising an alkali chlorate and sulfuric acid in the presence of a vanadium pentoxide catalyst.

3. A process for producing 2,5-dialkyl-p-benzoquinone which comprises reacting a 2,5-dialkylphenol with an oxidizing agent comprising an alkali chlorate and sulfuric acid in the presence of a vanadium pentoxide catalyst.

4. A process for producing 2-tert-butyl-5-methyl-p-benzoquinone which comprises reacting 2-tert-butyl-5-methylphenol with an oxidizing agent comprising an alkali chlorate and sulfuric acid in the presence of a vanadium pentoxide catalyst.

5. A process for producing a polyalkyl p-benzoquinone which comprises reacting at a temperature of from about $-10°$ C. to about $100°$ C., a polyalkyl phenol having an unsubstituted carbon atom in the para position to the hydroxyl group with an oxidizing agent comprising an alkali chlorate and sulfuric acid in the presence of a vanadium pentoxide catalyst.

6. A process for producing a dialkyl p-benzoquinone which comprises reacting at a temperature of from about $-10°$ C. to about $100°$ C., a dialkyl phenol having an unsubstituted carbon atom in the para position to the hydroxyl group with an oxidizing agent comprising an alkali chlorate and sulfuric acid in the presence of a vanadium pentoxide catalyst.

7. A process for producing a 2,5-dialkyl-p-benzoquinone which comprises reacting a 2,5-dialkylphenol at a temperature of from about $-10°$ to about $100°$ C. with an oxidizing agent comprising an alkali chlorate and sulfuric acid in the presence of a vanadium pentoxide catalyst.

8. A process for producing 2-tert-butyl-5-methyl-p-benzoquinone which comprises reacting 2-tert-butyl-5-methylphenol at a temperature of from about $-10°$ C. to about $100°$ C. with an oxidizing agent comprising an alkali chlorate and sulfuric acid in the presence of a vanadium pentoxide catalyst.

9. A process for producing a dialkyl-p-benzoquinone which comprises oxidizing a dialkyl phenol having an unsubstituted carbon atom in the para position to the hydroxyl group by treating said dialkylphenol with sulfuric acid and potassium chlorate in the presence of vanadium pentoxide at a temperature of from about $-10°$ C. to about $100°$ C.

10. A process for producing a dialkyl-p-benzoquinone which comprises oxidizing a dialkyl phenol having an unsubstituted carbon atom in the para position to the hydroxyl group by treating said dialkyl phenol with sulfuric acid and sodium chlorate in the presence of vanadium pentoxide at a temperature of from about $-10°$ C. to about $100°$ C.

11. A process for producing a 2,5-dialkyl-p-benzoquinone which comprises oxidizing a 2,5-dialkylphenol by treating said dialkyl phenol with sulfuric acid and sodium chlorate in the presence of vanadium pentoxide at a temperature of from about $-10°$ C. to about $100°$ C.

12. A process for producing a 2,5-dialkyl-p-benzoquinone which comprises oxidizing a 2,5-dialkylphenol by treating said dialkyl phenol with sulfuric acid and potassium chlorate in the presence of vanadium pentoxide at a temperature of from about $-10°$ C. to about $100°$ C.

13. A process for producing 2-tert-butyl-5-methyl-p-benzoquinone which comprises oxidizing 2-tert-butyl-5-methylphenol by treatment with sulfuric acid and potassium chlorate in the presence of vanadium pentoxide at a temperature of from about $-10°$ C. to about $100°$ C.

14. A process for producing 2-tert-butyl-5-methyl-p-benzoquinone which comprises oxidizing 2-tert-butyl-5-methylphenol by treatment with sulfuric acid and sodium chlorate in the presence of vanadium pentoxide at a temperature of from about $-10°$ C. to about $100°$ C.

No references cited.